United States Patent
Luitjens et al.

(10) Patent No.: US 9,880,851 B2
(45) Date of Patent: *Jan. 30, 2018

(54) SYSTEM, METHOD, AND COMPUTER PROGRAM PRODUCT FOR IMPLEMENTING LARGE INTEGER OPERATIONS ON A GRAPHICS PROCESSING UNIT

(71) Applicant: NVIDIA Corporation, Santa Clara, CA (US)

(72) Inventors: Justin Paul Luitjens, San Jose, CA (US); Nathan Craig Luehr, Stanford, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/951,282

(22) Filed: Nov. 24, 2015

(65) Prior Publication Data
US 2016/0077837 A1    Mar. 17, 2016

Related U.S. Application Data

(63) Continuation of application No. 13/778,048, filed on Feb. 26, 2013, now Pat. No. 9,244,683.

(51) Int. Cl.
G06F 7/38 (2006.01)
G06F 9/38 (2006.01)
G06F 9/30 (2006.01)
G06F 9/45 (2006.01)
G06F 9/44 (2006.01)
G06F 7/575 (2006.01)

(52) U.S. Cl.
CPC .............. G06F 9/3873 (2013.01); G06F 8/30 (2013.01); G06F 8/445 (2013.01); G06F 9/3001 (2013.01); G06F 7/575 (2013.01); G06F 8/443 (2013.01)

(58) Field of Classification Search
None
See application file for complete search history.

(56) References Cited

U.S. PATENT DOCUMENTS

2003/0204819 A1* 10/2003 Matsumoto ......... G06F 17/5045
716/102
2004/0215676 A1* 10/2004 Tang ....................... G06F 7/483
708/204

* cited by examiner

*Primary Examiner* — Michael D Yaary
(74) *Attorney, Agent, or Firm* — Zilka-Kotab, PC (57) ABSTRACT

A system, method, and computer program product for generating executable code for performing large integer operations on a parallel processing unit is disclosed. The method includes the steps of compiling a source code linked to a large integer library to generate an executable file and executing the executable file to perform a large integer operation using a parallel processing unit. The large integer library includes functions for processing large integers that are optimized for the parallel processing unit.

20 Claims, 6 Drawing Sheets

SYSTEM, METHOD, AND COMPUTER PROGRAM PRODUCT FOR IMPLEMENTING LARGE INTEGER OPERATIONS ON A GRAPHICS PROCESSING UNIT

CLAIM OF PRIORITY

This application is a continuation of U.S. patent application Ser. No. 13/778,048, filed Feb. 26, 2013, the entire contents of which is incorporated herein by reference.

FIELD OF THE INVENTION

The present invention relates to operations, and more particularly to techniques for implementing large integer operations.

BACKGROUND

Large integers are integers that are, typically, larger than 64 bits in width. Although large integers may include integers of 128 bits and 256 bits in length, large integers are commonly as wide as 4096 or 8192 bits. It will be appreciated that most common processors are designed to operate on 32-bit or 64-bit operands. In other words, a data pipeline in an arithmetic logic unit (ALU) is coupled to a number of registers (e.g., 8) which store operands for an operation. The ALU may be configured to process the operands according to an operation code (opcode) that indicates the type of operation to perform (i.e., addition, subtraction, etc.). The ALU produces a result from the operation and stores the result in another register. However, all operands and results must conform to the same format (e.g., 64-bit integers) and, therefore, large integers cannot be used as operands within the ALU.

Operations on large integers may be performed in software by breaking the large integer up into smaller units corresponding to the format of an ALU. For example, software may add the least significant bits of the large integer operands into the registers of the ALU and use these operands to produce an intermediate result. Then, the next least significant bits of the large integer operands are loaded into the registers of the ALU to produce another intermediate result, and so forth. In some operations, carryover bits may be included in the subsequent operations to produce the next intermediate results. The number of registers addressable by the ALU is typically small (e.g., 8 or 16 registers) and, therefore, storing intermediate results in the available registers may be impossible because all of the available registers quickly become full. To solve this issue, the intermediate results may be transferred from the registers to a memory coupled to the ALU for temporary storage. However, transferring the intermediate results to a memory is a high latency operation that slows down the processing of large integer operations. Thus, there is a need for processing large integer operations that addresses this issue and/or other issues associated with the prior art.

SUMMARY

A system, method, and computer program product for generating executable code for performing large integer operations on a parallel processing unit is disclosed. The method includes the steps of compiling a source code linked to a large integer library to generate an executable file and executing the executable file to perform a large integer operation using a parallel processing unit. The large integer library includes functions for processing large integers that are optimized for the parallel processing unit.

DETAILED DESCRIPTION

Figure 1:
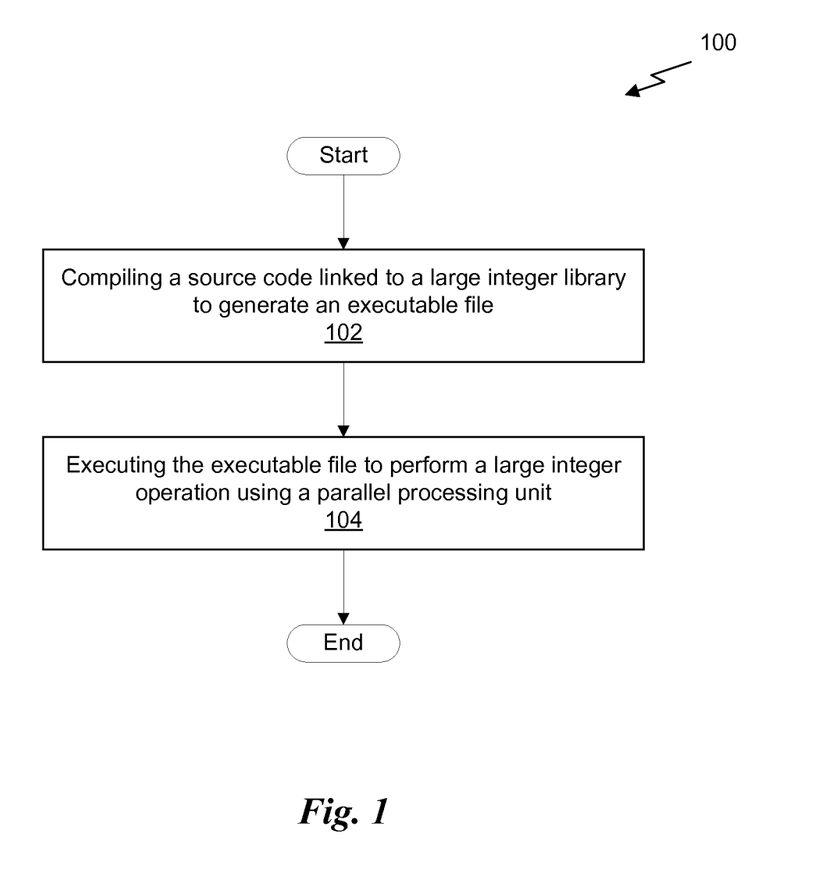
FIG. 1 illustrates a flowchart of a method for generating executable code for performing large integer operations on a parallel processing unit, in accordance with one embodiment.

FIG. 1 illustrates a flowchart 100 of a method for generating executable code for performing large integer operations on a parallel processing unit, in accordance with one embodiment. At step 102, source code is compiled by a compiler to generate an executable file. The source code is linked to a large integer library. In one embodiment, the source code includes an instruction (e.g., #include in C++) that links a header file that contains the large integer library to the source code. In another embodiment, the large integer library is a binary file that is dynamically linked to the source code at compile-time or run-time. At step 104, a processor executes the executable file to perform a large integer operation. In one embodiment, the processor causes a parallel processing unit to perform the large integer operation using a plurality of cores operating in parallel on the parallel processing unit.

It should be noted that, while various optional features are set forth herein in connection with performing large integer operations, such features are for illustrative purposes only and should not be construed as limiting in any manner.

Figure 2:
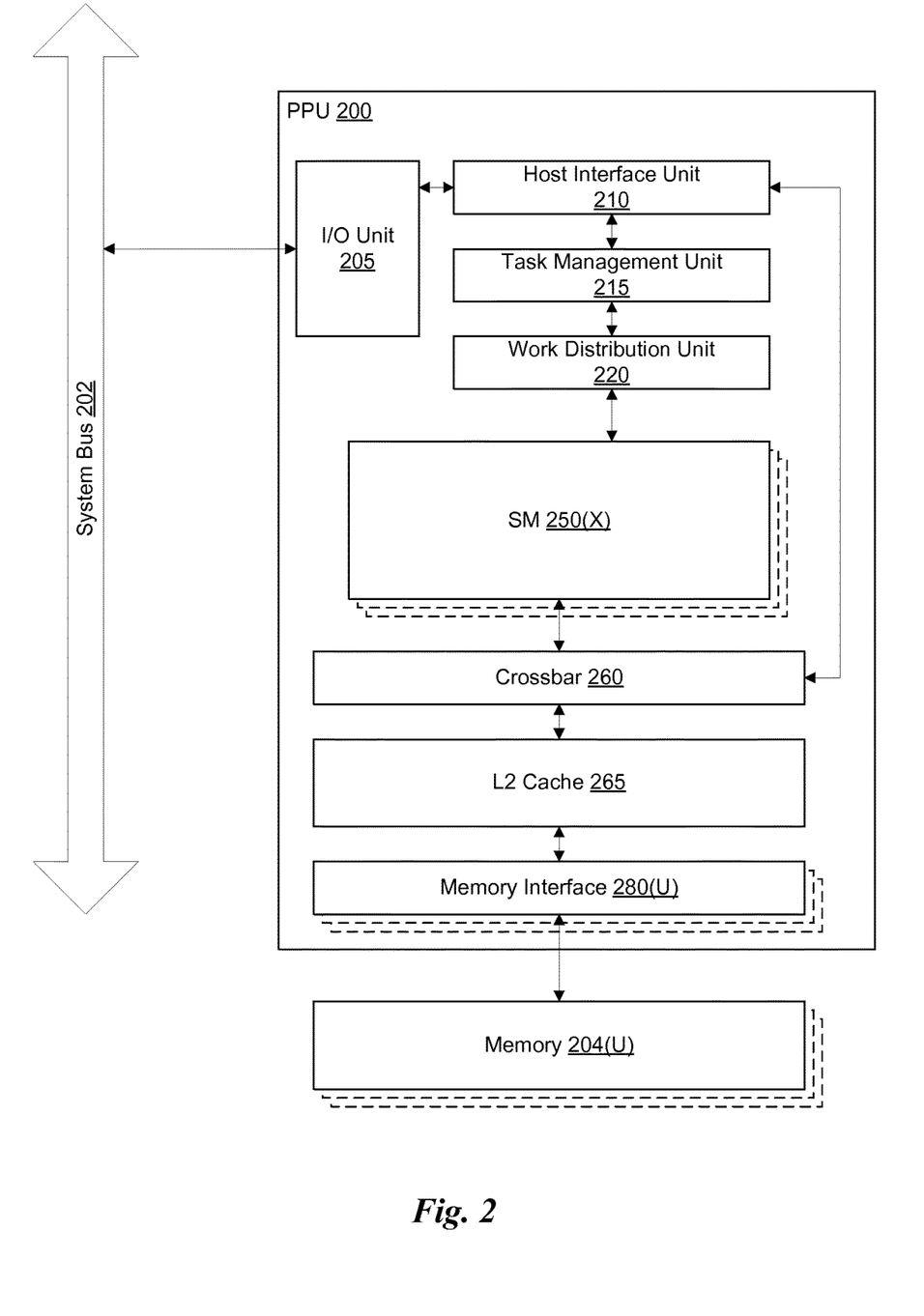
FIG. 2 illustrates a parallel processing unit, according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like. In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
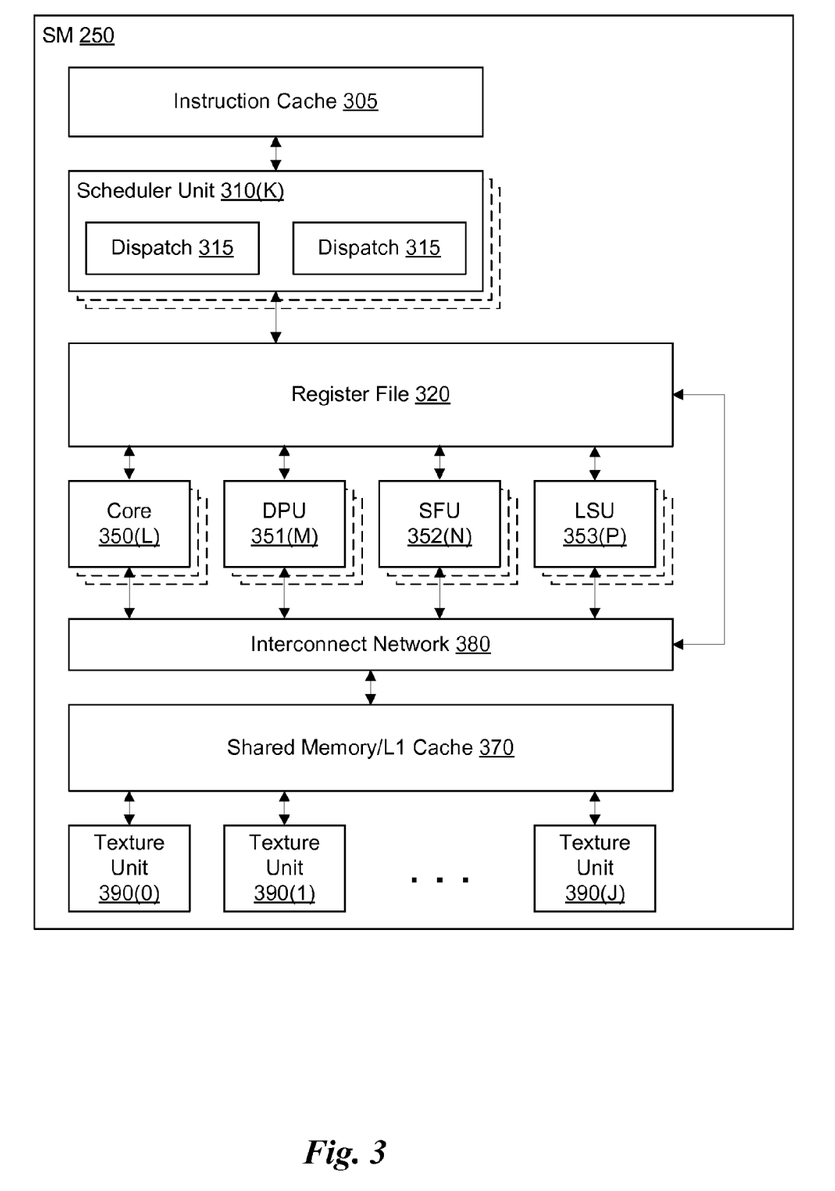
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Large Integer Operations

Figure 4:
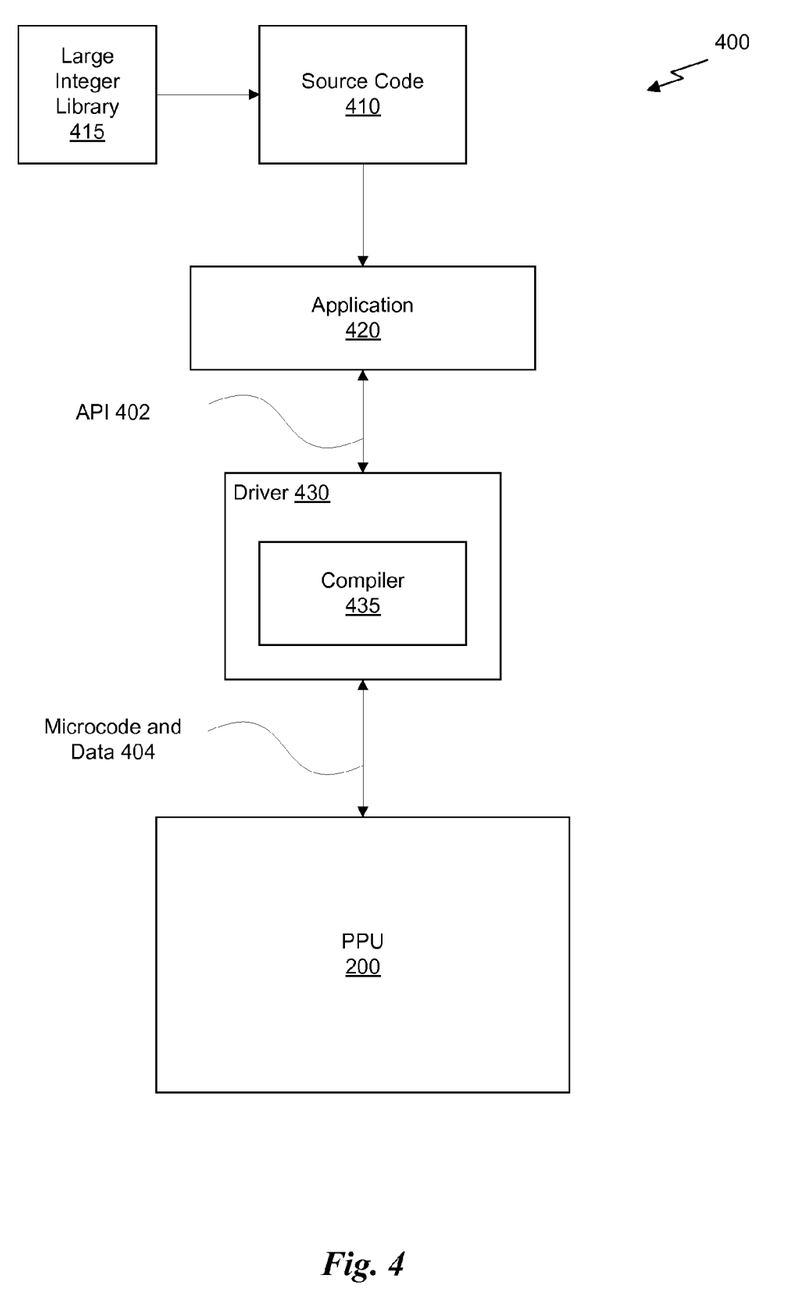
FIG. 4 illustrates a system for implementing large integer operations, in accordance with one embodiment.

FIG. 4 illustrates a system 400 for implementing large integer operations, in accordance with one embodiment. As shown in FIG. 4, a user may generate source code 410 for an application 420 using a high level programming language such as C++, C#, or Java. The source code 410 may include an instruction, such as an #include instruction in the C++ language, that enables the functionality of a large integer library 415 to be utilized within the source code 410. The large integer library 415 includes definitions for constants and functions that enable different operations to be executed via the PPU 200 of FIG. 2. In other words, the large integer library 415 is configured to optimize resource usage of PPU 200. For example, the functions and definitions within the large integer library 415 may be optimized to operate on one or more SMs 250 that are implemented within PPU 200. The large integer library 415 may also be optimized based on the size of a memory implemented within PPU 200 such as a size of the shared memory/L1 cache 370 or a size of the register file 320. In other embodiments, the large integer library 415 may be optimized for different architectures such as a central processing unit (e.g., Intel™ Core i7, ARM™ Cortex, etc.) or other specialized processors such as a system-on-chip (SoC) that incorporate various IC (Integrated Circuit) cores.

The source code 410 may be compiled by a conventional compiler such as the GNU Compiler Collection (gcc) to produce a binary executable (i.e., application 420). The application 420 may be executed on a computer system that includes the PPU 200. In one embodiment, the application 420 is executed by a CPU (not shown explicitly) that is coupled to PPU 200. The application 420 communicates with the PPU 200 via an application programming interface (API) 402 implemented by a driver 430. The driver 430 is executed by the CPU. The application 420 generates API calls that are transmitted to the driver 430. The driver 430 translates the API calls and generates microcode for execution by the PPU 200 via compiler 435. The compiler 435 is configured to translate device independent API calls into device specific microcode that can be executed by PPU 200.

The microcode and data 404 to be executed and processed, respectively, by the PPU 200 is transmitted to the PPU 200 over an interface such as a system bus, a PCIe (Peripheral Component Interconnect Express) interface, or other interface known in the art. The PPU 200 receives the microcode and schedules the instructions to be executed by one or more SMs 250 based on the instructions included in the microcode.

In one embodiment, the large integer library 415 includes functions for copying a large integer to a new location in memory, swapping one large integer in memory with another large integer in memory, zeroing out a large integer in memory, zeroing out a number of least significant bits of a large integer, zeroing out a number of most significant bits of a large integer, comparing two large integers, counting the number of set bits in a large integer, shifting the bits of a large integer by a number of bits (i.e., shift left and shift right), computing the logical OR of two large integers, computing the logical XOR (exclusive OR) of two large integers, computing the logical AND of two large integers, adding two large integers, subtracting two large integers, multiplying two large integers, multiplying two large integers and adding the intermediate result to another large integer (MAD), an exponentiation of a large integer ($C=A^B$), a modular multiplication of two large integers in Montgomery space ($C=A*B*R^{-1}$ mod m), and a modular exponentiation of a large integer in Montgomery space ($C=A^B*R^{-1}$ mod m), where $R^{-1}$ is the modular inverse. Some of the functions described above will be explained in more detail below. In alternative embodiments, a subset of the functions described above may be included in the large integer library 415. In yet other embodiments, additional functions described above, such as a division function or a modulus function, may be included in the large integer library 415 in addition to or in lieu of one or more of the functions described above.

As shown herein, the large integer library 415 is a library that provides large integer operation functionality to source code 410. In one embodiment, the large integer library 415 may be included in a header file written in the same high-level programming language as the source code 410. In alternative embodiments, the large integer library 415 may be compiled into a binary executable and linked to the source code (e.g., a dynamically-linked library or DLL). In yet other embodiments, the functionality of the large integer library 415 may be implemented as part of the API implemented by the driver 430. In other words, the driver 430 implements method calls as part of the API that are similar to the functions in the large integer library 415. The compiler 435 may generate the same microcode for the PPU 200 after receiving an API call as the compiler 430 would have if the application had transmitted a plurality of different API calls to the compiler 430 to perform the same large integer operation. In still yet other embodiments, the PPU 200 may be configured to natively execute large integer instructions. In other words, the instruction set of the PPU 200 may include opcodes for one or more of the large integer instructions described above and the WDU 220 is configured to decode the opcodes and launch a task for implementing the large integer operation specified by the opcode on one or more SMs 250. In such embodiments, the PPU 200 may include cores 350 or other specialized execution units that are configured to perform the various operations associated with the large integer operations.

Figure 5A:
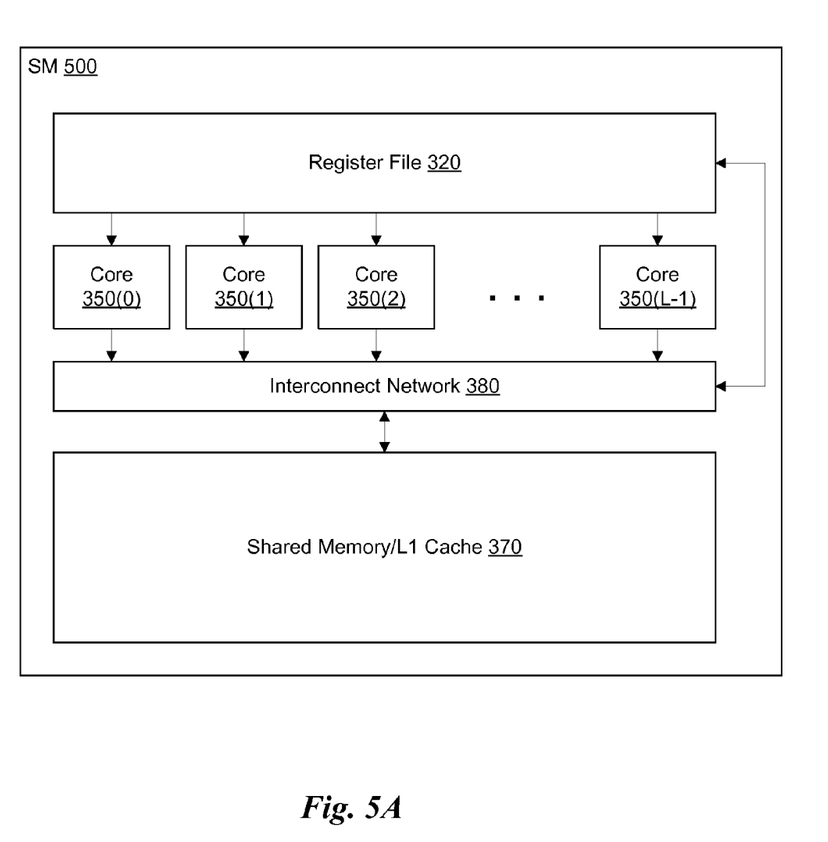
FIG. 5A illustrates an streaming multiprocessor, in accordance with one embodiment.

FIG. 5A illustrates an SM 500, in accordance with one embodiment. The SM 500 may be included within PPU 200, such as the SM 250 of FIG. 2. Again, as shown in FIG. 5A, the SM 500 includes a register file 320, a number L of cores 350, an interconnect network 380 such as a crossbar, and a shared memory/L1 cache 370. The large integer operations are configured based on the configuration of the SM 500. For example, in one embodiment, SM 500 may include 32 cores 350 configured to execute a plurality of threads in parallel. In one embodiment, instructions from 32 threads are executed in parallel across the 32 cores 350. Data is loaded into the register file 320 and coupled to each of the cores 350 to be processed by the hardware execution pipeline implemented in each of the cores 350. The cores 350 produce results which are stored back in the register file 320 or into temporary storage in the shared memory/L1 cache 370. The shared memory/L1 cache 370 may be a local RAM of a particular size (e.g., 64 kilobytes) that can be configured to have a first portion (e.g., 16 kB) that is configured as an L1 cache coupled to one or more other higher-level cache units as well as a local memory external to the PPU 200 and a second portion (e.g., 48 kB) that is configured as a shared memory that is accessible by any of the cores 350. In one embodiment, the PPU 200 may be configured entirely as an L1 cache (e.g., 64 kB of L1 cache) or entirely as a shared memory (e.g., 64 kB of shared memory), as per the desired memory requirements of the large integer library 415.

Figure 5B:
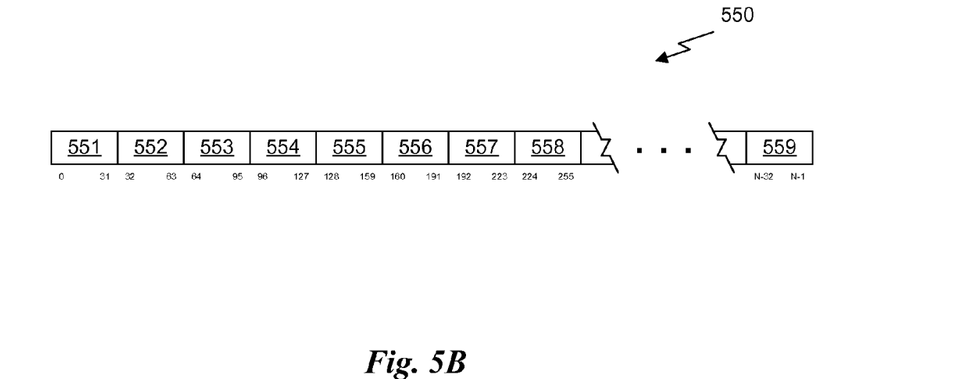
FIG. 5B illustrates a large integer, in accordance with one embodiment.

FIG. 5B illustrates a large integer 550, in accordance with one embodiment. In one embodiment, the large integer 550 is N bits wide, where N is greater than the integer pipeline width in the cores 350. For example, the cores 350 may be configured to operate on 32-bit integers. In other words, the hardware execution pipeline within each of the cores 350 is configured to operate on 32-bit integer values. Because the large integer 550 is greater than 32 bits wide, the cores 350 cannot perform operations on the large integer 550 without breaking up the large integer 550 into smaller portions of 32-bits or less.

In one embodiment, the large integer 550 is 4096 bits wide (e.g., $2^{12}$). In order to process the large integer 550, the large integer 550 is sub-divided into 32-bit portions (i.e., limbs). Each limb (e.g., 551, 552, 553, etc.) is 32-bits wide. A subset of the limbs (e.g., a number of limbs equal to the number of cores 350) is distributed to the cores 350 to process into intermediate results. The intermediate results are stored in the shared memory/L1 cache 370 or the register file. Then, the next subset of limbs are distributed to the cores 350 and so forth for processing until all of the limbs of the large integer 550 have been processed by the PPU 200. In one embodiment, the number of limbs in the large integer 550 is not an even multiple of the number of cores 350 within the PPU 200. In such cases, the large integer 550 may be padded with a number of zeros such that the size of the padded large integer 550 is an even multiple of the number of cores 350. Alternatively, the intermediate results from any unused cores 350 may be ignored.

Returning now to FIG. 5A, various example large integer operations will be described with respect to the architecture of SM 500. In one embodiment, the large integer library 415 defines the width of a limb (e.g., 32-bits, 64-bits, etc.). In addition, the large integer library 415 may define other architecture specific variables such as the number of threads in a task or the execution width of the SIMD processor (i.e., the number of cores 350). A task may be defined as a plurality of threads to be executed on a set of data. Each thread in a task may be assigned a specific index. For example, a task for executing a large integer operation may include 256 threads in a two-dimensional array (e.g., 8 groups of 32 threads). Each thread is associated with an x-coordinate index (ThreadIdx.x) and a y-coordinate index (ThreadIdx.y). The thread index(es) may be useful for calculating offsets in memory that define the starting location of a particular limb of the large integer 550 that is to be processed by the thread. A task may be defined as a number of warps (i.e., thread blocks) that are executed in parallel on the SM 500. For example, a task comprised of 256 threads may include 8 warps of 32 threads each.

Operands for large integer operations may be stored in the register file 320 if the register file 320 has enough resources to hold the large integers plus the additional resources needed for any temporary data. For example, a large integer having 512 bits may fit in one 32-bit register per core (i.e., in an architecture with 16 cores 350). In such architectures, each core 350 may be associated with a lane of registers in the register file (e.g., 16 registers per core 350). This particular configuration would enable two large integer operands to be stored in the register file along with 14 free registers per core for storing temporary data. In another embodiment, operands for large integers may be stored in the shared memory/L1 cache 370. For example, the driver 430 at run-time may be configured to allocate contiguous portions of the shared memory/L1 cache 370 for storing operands for large integer operations. The shared memory/L1 cache 370 should be large enough to store all of the operands locally plus any additional data needed for overhead while processing the operation. In one embodiment, the operands may be stored in a unified memory architecture such that the operands are loaded into the L1 cache 370 from a local memory such as memory 204. In order to ensure that the large integer operation is performed as efficiently as possible, the operands need to be fully loaded into the local memory resources of the SM 250 (e.g., the shared memory/L1 cache 370 or the register file 320). High latency memory access operations (e.g., caused by a cache miss) should be avoided whenever possible. In other embodiments, the local memory resources of the processor may be insufficient to hold very large integers. For example, the shared memory/L1 cache 370 may be 1 kB and each operand may be 8096 bits wide (i.e., 1 kB). Therefore, only portions of each of the operations may be loaded into the L1 cache 370 at a time.

The next section will provide specific examples of large integer operations implemented by the large integer library 415, according to one embodiment. It will be appreciated that these examples are provided for illustration only and that other types of large integer operations may be included in lieu of or in addition to the types of operation illustrated below.

In one embodiment, the large integer library 415 includes a swap operation. Pseudocode for the swap operation is provided as set forth in Table 1, shown below. The swap operation is processed by a plurality of threads in parallel executing on the plurality of cores 350. As shown in Table 1, swapping one large integer with another large integer involves having each thread read a portion of the two operands from local memory (e.g., either the register file 320 or the shared memory/L1 cache 370) and storing the portions in temporary variables (e.g., ai and bi). The temporary variables are then stored back into the memory of the opposite large integer. More specifically, each of the L cores 350 reads in a portion (e.g., one limb or 32 bits) of each of the large integer operands based on an index i. The method getLimb( ) takes the index and retrieves the data in the operand at an offset based on the index i as well as the thread index for the particular thread. For example, a first core 350(0) may be executing a first thread having a thread index of 0. The method getLimb(0) executed by the first thread returns the first 32 bits of the operand. A second core 350(1) may be executing a second thread having a thread index of 1. The method getLimb(0) executed by the second thread returns the second 32 bits of the operand because the thread index is multiplied by the size of the Limb in order to generate an offset into the contiguous memory space allocated to the operand. The other cores 350 operate in a similar fashion. The method setLimb( ) takes the index i and a Limb and stores the Limb at a location in the operand based on the index i and the thread index.

The main for loop of the SWAP function increments i by a variable warp, which indicates the execution width of the SIMD processor. In other words, if the operands are larger than the number of cores multiplied by the width of a particular Limb, then the threads must execute the main for loop again in order to swap any additional bits of the operand. For example, with 16 cores operating on 32-bit wide Limbs, operands greater than 512 bits wide require more than one pass of the main for loop.

In one embodiment, the SWAP operation truncates any additional bits if one of the operands is longer than the other. As shown in Table 1, the main for loop is incremented as long as i is less than the minimum number of Limbs in the two operands, given by the method minLimbs( ), that indicates the minimum size of the two operands. The two additional for loops zero out any additional bits in the larger operand of the two operands.

TABLE 1

```
void SWAP(A &a, B &B)
{
    for ( int i = 0; i < minLimbs(a,b); i += warp ) {
        Limb ai = a.getLimb(i);
        Limb bi = b.getLimb(i);
        a.setLimb(i, bi);
        b.setLimb(i, ai);
    }
    for ( int i = minLimbs; i < a.numLimbs( ); i += warp ) {
        a.setLimb(i, 0);
    }
    for ( int i = minLimbs; i < b.numLimbs( ); i += warp ) {
        b.setLimb(i, 0);
    }
}
```

In one embodiment, the large integer library 415 includes an addition operation (i.e., c=a+b). Pseudocode for the addition operation is provided as set forth in Table 2, shown below. Similar to the swap operation, the addition operation is processed by a plurality of threads in parallel executing on the plurality of cores 350. As shown in Table 2, each thread reads the Limbs from one operand (e.g., operand a) into an array in scratch memory. The method getScratchMemory( ) takes a handle h passed to the ADD method as an input and returns a handle to a shared memory space S. The scratch memory is used by all executing threads in order to pass carry bit information between threads. Once the first operand has been loaded into the scratch memory space (i.e., as shown in the first two for loops in Table 2), the main for loop is executed to add a second operand to the first operand.

As shown in Table 2, each thread executing within a core loads a limb of the second operand into a temporary variable, carry, and loads a limb of the first operand from the scratch memory space into a temporary variable, t. A method addc( ) takes two arguments, t and carry, adds the two arguments together and stores the result in t. If the result of the addition operation results in a carry bit (i.e., the sum of the two operands is larger than the number of bits for a Limb), then a value of one is stored in carry. The value of t is stored back into the scratch memory space at a location associated with the index j and the thread index for the particular thread. The main for loop has a nested for loop that handles propagation of the carry bits. In other words, for any thread that results in a carry bit, the thread loads the value from the scratch memory space for an adjacent limb into a temporary variable, t, the addc( ) method is called with the arguments t from the adjacent limb and carry from the current thread to add a value of one to the result stored in the scratch memory space for the adjacent limb. If adding one to the result stored in the scratch memory space results in an additional carry then the carry loop is executed again on the adjacent limb. The carry loop is repeated until no additional carries occur. Thus the carry bit propagates through the large integer value stored in the scratch memory space. Once all of the threads have executed and the result of the addition operation is stored in the scratch memory space and all carry bits have been propagated through the result, the value in the scratch memory space is stored in the location of the variable c.

In one embodiment, the large integer library 415 includes a subtraction operation that is similar in implementation to the addition operation except that the operands are subtracted from each other instead of added to each other.

TABLE 2

```
void ADD(scratchHandle &h, C &c, A &a, B &B)
{
    scratchMemory &S = getScratchMemory(handle);
    for ( int i = 0; i < CAmin(c,a); i += warp ) {
        S[i+threadIdx] = a.getLimb(i);
    }
    for ( int i = CAmin(c,a); i < c.numLimbs( ); i += warp ) {
        S[i+threadIdx] = 0;
    }
    for ( int j = 0; j < CBmin(c,b); j += warp ) {
        Limb carry = b.getLimb(j);
        Limb t = S[j+threadIdx];
        addc(t, carry);
        S[j+threadIdx] = t;
        for ( int k = j + threadIdx + 1; carry && k < c.numLimbs( ); ++k ) {
            t = S[k];
            addc(t, carry);
            S[k] = t + carry;
        }
    }
    for ( int i = 0; i < c.numLimbs( ); i += warp ) {
        c.setLimb(i, S[i+threadIdx]);
    }
}
```

In one embodiment, the large integer library 415 includes a multiplication operation (i.e., c=a*b). Pseudocode for the multiplication operation is provided as set forth in Table 3, shown below. Each thread in the multiply operation zeros out a scratch memory space associated with that thread. In the main for loop, each thread loads a Limb from the first operand, a, into a temporary variable, aval, and initializes a temporary variable, carry, to zero. A first nested loop loads a Limb from the second operand, b, into the scratch memory space if the sum of the indexes for the main for loop and the first nested loop (e.g., index j and index k) are less than the number of Limbs in the variable for storing the result, c. In the second nested loop, each Limb of the second operand, b, is multiplied by the value in the temporary variable aval and added to a corresponding value stored in the temporary variable cval along with any previous carry information by computing wmadad(a, b, c, carry)=a*b+c+carry, where upon completion, c contains the result for the current limb and carry contains the result to be carried to the adjacent limb.

Once all of the threads have executed and the result of the multiply operation is stored in the scratch memory space and all carry information has been propagated through the result, the value in the scratch memory space is stored in the location of the variable c.

TABLE 3

```
void MUL(scratchHandle &h, C &c, A &a, B &B)
{
    scratchMemory &S = getScratchMemory(handle);
    for ( int i = CAmin(c,a); i < c.numLimbs( ); i += warp ) {
        S[i+threadIdx] = 0;
    }
    for ( int j = 0; j < CAmin(c,a); j += warp ) {
        Limb aval = a.getLimb(j);
        Limb carry = 0;
        for ( int k = 0; k < CBmin(c,b); k += warp ) {
            if ( j + k < c.numLimbs( ) ) {
                S[c.numLimbs( ) + threadIdx] = b.getLimb(k);
            }
            for ( int m = 0; m < warp; ++m ) {
                Limb bval = S[c.numLimbs( ) + m];
                Limb cval = S[j+k+m+threadIdx];
                wmadad(aval, bval, cval, carry);
                S[c.numLimbs( ) + m] = cval;
            }
        }
        for ( int m = CBmin(c,b) + j + threadIdx; carry != 0 && m < c.numLimbs( ); ++m ) {
            Limb cval = S[m];
            addc(cval, carry);
            S[m] = cval;
        }
    }
    for ( int i = 0; i < c.numLimbs( ); i += warp ) {
        c.setLimb(i, S[i+threadIdx]);
    }
}
```

In addition to the example operation set forth above, other types of operations may make use of one or more of the operations shown herein. For example, an exponential operation (i.e., $c=A^B$) may utilize the multiply operation illustrated by the pseudocode set forth above in Table 3.

Figure 6:
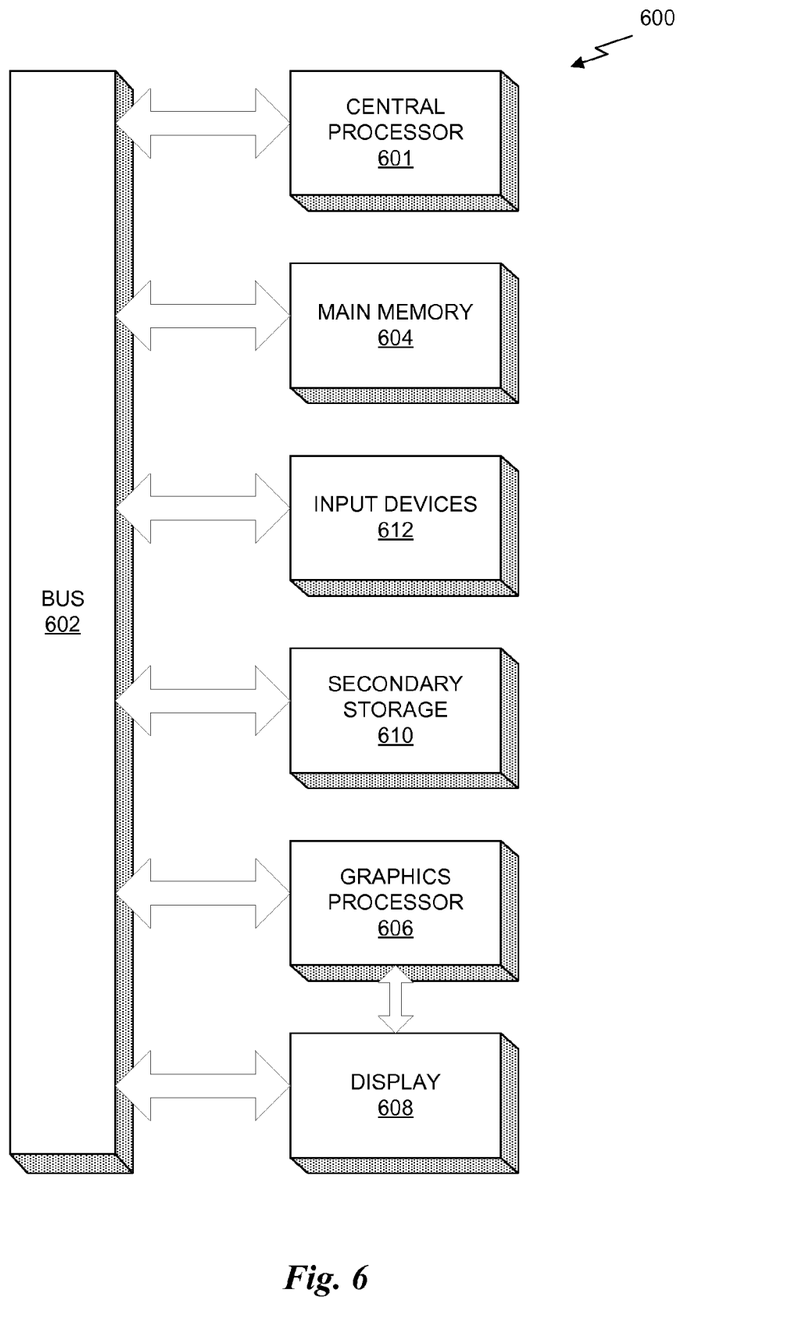
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. In one embodiment, the source code 410 and large integer library 415 may be stored in the memory 604 and/or storage 610. A compiler is executed by the CPU 601 to generate the executable file (i.e., application 420), which is configured to be executed by the CPU 601. When executed, the application 420 transmits commands to the driver 430 (also executed by the CPU 601) that cause the driver to generate microcode for execution by the GPU 606 for performing large integer operations.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    executing an application on a processor, wherein a source code for the application is linked to a large integer library that includes definitions for functions that enable operations for large integers to be executed on a parallel processing unit; and
    executing a large integer operation on the parallel processing unit,
    wherein the functions are configured based on an integer pipeline width for each core in a plurality of cores in the parallel processing unit,
    wherein the large integer operation includes one or more operands, each operand in the one or more operands sub-divided into a plurality of limbs, each limb having a width equal to the integer pipeline width, and
    wherein the plurality of limbs for the one or more operands are distributed to the plurality of cores to produce intermediate results for the large integer operation.

2. The method of claim 1, wherein each core in the plurality of cores includes an integer pipeline width of 32 bits.

3. The method of claim 1, wherein a format of a large integer provided as an operand in the large integer operation comprises at least 1024 bits.

4. The method of claim 1, wherein the large integer library is included as a header file linked to the source code.

5. The method of claim 1, wherein the large integer library is a binary file that is dynamically linked to the source code.

6. The method of claim 1, wherein the functions are optimized for the parallel processing unit based on a number of cores within the parallel processing unit.

7. The method of claim 6, wherein the large integer operation is performed by:
    loading at least two operands into a local memory associated with the parallel processing unit; and
    executing a plurality of threads on at least two cores in parallel to generate a result for the large integer operation.

8. The method of claim 1, wherein the large integer library defines a function for an addition operation that generates a large integer result by summing a first large integer operand and a second large integer operand.

9. The method of claim 8, wherein the addition operation comprises:
    dividing the first large integer operand and the second large integer operand into a plurality of limbs;
    for each corresponding pair of limbs from the first large integer operand and the second large integer operand, summing the limb from the first large integer operand to the limb from the second large integer operand to generate a result associated with the corresponding pair of limbs;
    determining whether the result for each corresponding pair of limbs generates a carry bit; and
    propagating the carry bits generated by summing each corresponding pair of limbs in the result.

10. The method of claim 1, wherein the large integer library defines a function for an addition operation, a subtraction operation, a multiplication operation, a swap operation, a logical OR operation, and a logical AND operation.

11. A non-transitory computer-readable storage medium storing instructions that, when executed by a processor, cause the processor to perform steps comprising:
    executing an application on the processor, wherein a source code for the application is linked to a large integer library that includes definitions for functions that enable operations for large integers to be executed on a parallel processing unit; and executing a large integer operation on the parallel processing unit, wherein the functions are configured based on an integer pipeline width for each core in a plurality of cores in the parallel processing unit, wherein the large integer operation includes one or more operands, each operand in the one or more operands sub-divided into a plurality of limbs, each limb having a width equal to the integer pipeline width, and wherein the plurality of limbs for the one or more operands are distributed to the plurality of cores to produce intermediate results for the large integer operation.

12. The computer-readable storage medium of claim 11, wherein each core in the plurality of cores includes an integer pipeline width of 32 bits.

13. The computer-readable storage medium of claim 11, wherein the functions are optimized for the parallel processing unit based on a number of cores within the parallel processing unit.

14. The computer-readable storage medium of claim 13, wherein the large integer operation is performed by:

loading at least two operands into a local memory associated with the parallel processing unit; and executing a plurality of threads on at least two cores in parallel to generate a result for the large integer operation.

15. A system, comprising;

a memory storing an application, wherein a source code for the application is linked to a large integer library that includes definitions for functions that enable operations for large integers to be executed on a parallel processing unit;

a processor configured to execute the application; and the parallel processing unit configured to execute a large integer operation, wherein the functions are configured based on an integer pipeline width for each core in a plurality of cores in the parallel processing unit, wherein the large integer operation includes one or more operands, each operand in the one or more operands sub-divided into a plurality of limbs, each limb having a width equal to the integer pipeline width, and wherein the plurality of limbs for the one or more operands are distributed to the plurality of cores to produce intermediate results for the large integer operation.

16. The system of claim 15, wherein each core in the plurality of cores includes an integer pipeline width of 32 bits.

17. The system of claim 15, wherein the parallel processing unit includes a streaming multiprocessor having a shared memory accessible by a plurality of cores.

18. The system of claim 17, wherein operands for the large integer operation are stored in the shared memory.

19. The system of claim 15, wherein the functions are optimized for the parallel processing unit based on a number of cores within the parallel processing unit.

20. The system of claim 15, wherein the large integer operation is performed by:

loading at least two operands into a local memory associated with the parallel processing unit; and executing a plurality of threads on at least two cores in parallel to generate a result for the lage integer operation.

* * * * *

UNITED STATES PATENT AND TRADEMARK OFFICE
CERTIFICATE OF CORRECTION

PATENT NO. : 9,880,851 B2
APPLICATION NO. : 14/951282
DATED : January 30, 2018
INVENTOR(S) : Justin Paul Luitjens et al.

Page 1 of 1

It is certified that error appears in the above-identified patent and that said Letters Patent is hereby corrected as shown below:

In the Specification

Column 10, Line 67 please replace "The value oft" with --The value of t--.

In the Claims

Column 16, Line 30 please replace "lage integer" with --large integer--.

Signed and Sealed this
Eighteenth Day of February, 2020

Andrei Iancu
*Director of the United States Patent and Trademark Office*